US008738412B2

(12) United States Patent
Flockhart et al.

(10) Patent No.: US 8,738,412 B2
(45) Date of Patent: May 27, 2014

(54) METHOD AND APPARATUS FOR SUPPORTING INDIVIDUALIZED SELECTION RULES FOR RESOURCE ALLOCATION

(75) Inventors: Andrew D. Flockhart, Thornton, CO (US); Larry John Roybal, Westminster, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 2949 days.

(21) Appl. No.: 10/891,346

(22) Filed: Jul. 13, 2004
(Under 37 CFR 1.47)

(65) Prior Publication Data

US 2006/0015388 A1   Jan. 19, 2006

(51) Int. Cl.
*G06Q 10/00* (2012.01)
*G06Q 10/06* (2012.01)

(52) U.S. Cl.
CPC .............................. *G06Q 10/063112* (2013.01)
USPC ...................................................... 705/7.14

(58) Field of Classification Search
CPC ............................................. G06Q 10/063112
See application file for complete search history.

(56) References Cited

U.S. PATENT DOCUMENTS

| 4,510,351 | A |   | 4/1985  | Costello et al. |
|-----------|---|---|---------|-----------------|
| 5,164,981 | A |   | 11/1992 | Mitchell et al. |
| 5,167,010 | A |   | 11/1992 | Elm et al. |
| 5,185,780 | A |   | 2/1993  | Leggett |
| 5,206,903 | A |   | 4/1993  | Kohler et al. ................. 379/309 |
| 5,274,700 | A | * | 12/1993 | Gechter et al. ........... 379/211.01 |
| 5,289,368 | A |   | 2/1994  | Jordan et al. |
| 5,291,550 | A | * | 3/1994  | Levy et al. ..................... 379/242 |
| 5,325,292 | A |   | 6/1994  | Crockett |
| 5,335,269 | A |   | 8/1994  | Steinlicht |
| 5,467,391 | A |   | 11/1995 | Donaghue et al. |

(Continued)

FOREIGN PATENT DOCUMENTS

| EP | 0 740 450 A2 | 10/1996 |
|----|--------------|---------|
| EP | 0770967      | 5/1997  |

(Continued)

OTHER PUBLICATIONS

Judge et al., Agent-enhanced workflow, BT Technologies Journal, vol. 16 No. 3, 1998.

(Continued)

*Primary Examiner* — Brett Feeney
(74) *Attorney, Agent, or Firm* — Sheridan Ross P.C.

(57) ABSTRACT

The present invention relates to the matching of resources to work entries. In particular, the present invention allows work items to be assigned to a particular resource based on the characteristics of the work item and on the qualifications and preferences of the resource. Furthermore, the present invention does not rely on queues, thereby allowing characteristics of a work item other than or in addition to the amount of time that a work item has been waiting for service to be considered in assigning the work item to a resource. The types of work items that may be validly assigned to a resource, or the preference rules used to select a valid work item for handling by a resource, may be altered by altering the validation rules and preference rules associated with the resource and/or work item. Accordingly, the rules for allocating work may be adjusted easily and quickly, including at run-time, and may represent any attribute desired for use in allocating work.

10 Claims, 4 Drawing Sheets

(56) References Cited

U.S. PATENT DOCUMENTS

| | | | |
|---|---|---|---|
| 5,499,291 A | 3/1996 | Kepley | |
| 5,555,299 A | 9/1996 | Maloney et al. | |
| 5,577,169 A | 11/1996 | Prezioso | |
| 5,590,188 A | 12/1996 | Crockett | |
| 5,603,029 A | 2/1997 | Aman et al. | |
| 5,604,892 A | 2/1997 | Nuttall et al. | |
| 5,721,770 A | 2/1998 | Kohler | |
| 5,742,763 A | 4/1998 | Jones | |
| 5,754,639 A | 5/1998 | Flockhart et al. | 379/221 |
| 5,784,452 A | 7/1998 | Carney | |
| 5,790,642 A | 8/1998 | Taylor et al. | |
| 5,790,650 A | 8/1998 | Dunn et al. | |
| 5,802,510 A | 9/1998 | Jones | |
| 5,819,084 A | 10/1998 | Shapiro et al. | |
| 5,825,869 A | 10/1998 | Brooks et al. | 379/265 |
| 5,826,039 A | 10/1998 | Jones | |
| 5,828,747 A | 10/1998 | Fisher et al. | 379/309 |
| 5,836,011 A | 11/1998 | Hambrick et al. | |
| 5,864,874 A | 1/1999 | Shapiro | |
| 5,901,214 A | 5/1999 | Shaffer et al. | |
| 5,905,793 A | 5/1999 | Flockhart et al. | 379/266 |
| 5,909,669 A | 6/1999 | Havens | |
| 5,911,134 A | 6/1999 | Castonguay et al. | |
| 5,914,951 A | 6/1999 | Bentley et al. | |
| 5,923,745 A | 7/1999 | Hurd | |
| 5,926,539 A | 7/1999 | Shtivelman | |
| 5,941,983 A | 8/1999 | Gupta et al. | |
| 5,963,911 A | 10/1999 | Walker et al. | 705/7 |
| 5,982,873 A | 11/1999 | Flockhart et al. | 379/266 |
| 6,014,437 A | 1/2000 | Acker et al. | |
| 6,031,896 A | 2/2000 | Gardell et al. | |
| 6,038,296 A | 3/2000 | Brunson et al. | |
| 6,044,355 A * | 3/2000 | Crockett et al. | 705/8 |
| 6,049,779 A | 4/2000 | Berkson | |
| 6,058,179 A | 5/2000 | Shaffer et al. | |
| 6,070,142 A | 5/2000 | McDonough et al. | |
| 6,088,441 A | 7/2000 | Flockhart et al. | 379/265 |
| 6,097,885 A | 8/2000 | Rayner | |
| 6,108,670 A | 8/2000 | Weida et al. | |
| 6,128,304 A | 10/2000 | Gardell et al. | |
| 6,163,607 A * | 12/2000 | Bogart et al. | 379/266.01 |
| 6,173,053 B1 | 1/2001 | Bogart et al. | 379/266 |
| 6,185,603 B1 | 2/2001 | Henderson et al. | |
| 6,192,122 B1 | 2/2001 | Flockhart et al. | 379/266 |
| 6,240,417 B1 | 5/2001 | Eastwick et al. | |
| 6,272,544 B1 * | 8/2001 | Mullen | 709/226 |
| 6,275,812 B1 | 8/2001 | Haq et al. | 705/11 |
| 6,298,062 B1 | 10/2001 | Gardell et al. | |
| 6,307,931 B1 | 10/2001 | Vaudreuil | |
| 6,314,177 B1 | 11/2001 | Davis et al. | |
| 6,324,282 B1 | 11/2001 | McIllwaine et al. | |
| 6,332,081 B1 | 12/2001 | Do | |
| 6,339,754 B1 | 1/2002 | Flanagan et al. | |
| 6,360,222 B1 | 3/2002 | Quinn | |
| 6,363,411 B1 | 3/2002 | Dugan et al. | |
| 6,366,666 B2 | 4/2002 | Bengtson et al. | |
| 6,373,836 B1 | 4/2002 | Deryugin et al. | |
| 6,389,400 B1 | 5/2002 | Bushey et al. | 705/7 |
| 6,411,682 B1 | 6/2002 | Fuller et al. | |
| 6,434,230 B1 | 8/2002 | Gabriel | 379/265.01 |
| 6,446,092 B1 | 9/2002 | Sutter | |
| 6,449,358 B1 | 9/2002 | Anisimov et al. | |
| 6,463,471 B1 | 10/2002 | Dreke et al. | |
| 6,487,290 B1 | 11/2002 | Le Grand | |
| 6,519,570 B1 | 2/2003 | Faber et al. | |
| 6,535,600 B1 | 3/2003 | Fisher et al. | 379/265.12 |
| 6,546,087 B2 * | 4/2003 | Shaffer et al. | 379/90.01 |
| 6,553,113 B1 | 4/2003 | Dhir et al. | |
| 6,553,114 B1 | 4/2003 | Fisher et al. | |
| 6,556,974 B1 | 4/2003 | D'Alessandro | |
| 6,560,329 B1 | 5/2003 | Draginich et al. | |
| 6,560,330 B2 | 5/2003 | Gabriel | 379/265.02 |
| 6,571,285 B1 | 5/2003 | Groath et al. | |
| 6,574,599 B1 | 6/2003 | Lim et al. | |
| 6,574,605 B1 * | 6/2003 | Sanders et al. | 705/8 |
| 6,584,191 B1 * | 6/2003 | McPartlan et al. | 379/265.02 |
| 6,587,831 B1 * | 7/2003 | O'Brien | 705/8 |
| 6,603,854 B1 | 8/2003 | Judkins et al. | |
| 6,604,084 B1 | 8/2003 | Powers et al. | |
| 6,636,598 B1 * | 10/2003 | Thomson et al. | 379/265.05 |
| 6,639,982 B1 | 10/2003 | Stuart et al. | |
| 6,668,167 B1 | 12/2003 | McDowell et al. | |
| 6,675,168 B2 | 1/2004 | Shapiro et al. | |
| 6,687,257 B1 | 2/2004 | Balasubramanian | |
| 6,700,967 B2 | 3/2004 | Kleinoder et al. | |
| 6,711,253 B1 | 3/2004 | Prabhaker | |
| 6,711,255 B2 | 3/2004 | Berrondo et al. | |
| 6,714,643 B1 * | 3/2004 | Gargeya et al. | 379/266.06 |
| 6,718,330 B1 | 4/2004 | Zenner | |
| 6,724,884 B2 | 4/2004 | Jensen et al. | |
| 6,735,299 B2 | 5/2004 | Krimstock et al. | |
| 6,735,593 B1 | 5/2004 | Williams | |
| 6,738,462 B1 | 5/2004 | Brunson | |
| 6,744,877 B1 | 6/2004 | Edwards | |
| 6,748,414 B1 | 6/2004 | Bournas | |
| 6,754,333 B1 | 6/2004 | Flockhart et al. | |
| 6,757,362 B1 | 6/2004 | Cooper et al. | |
| 6,766,326 B1 | 7/2004 | Cena | |
| 6,775,377 B2 | 8/2004 | McIllwaine et al. | |
| 6,785,666 B1 | 8/2004 | Nareddy et al. | |
| 6,801,520 B2 | 10/2004 | Philonenko | |
| 6,822,945 B2 * | 11/2004 | Petrovykh | 370/270 |
| 6,829,348 B1 | 12/2004 | Schroeder et al. | |
| 6,839,735 B2 | 1/2005 | Wong et al. | |
| 6,842,503 B1 | 1/2005 | Wildfeuer | |
| 6,847,973 B2 | 1/2005 | Griffin et al. | |
| 6,850,613 B2 * | 2/2005 | McPartlan et al. | 379/265.02 |
| 6,859,529 B2 * | 2/2005 | Duncan et al. | 379/266.1 |
| 6,898,190 B2 * | 5/2005 | Shtivelman et al. | 370/270 |
| 6,915,305 B2 | 7/2005 | Subramanian et al. | |
| 6,937,993 B1 * | 8/2005 | Gabbita et al. | 705/8 |
| 6,947,988 B1 | 9/2005 | Saleh | |
| 6,968,052 B2 | 11/2005 | Wullert, II | |
| 6,968,509 B1 | 11/2005 | Chang et al. | |
| 6,970,554 B1 | 11/2005 | Peterson et al. | |
| 6,970,829 B1 * | 11/2005 | Leamon | 705/9 |
| 6,981,061 B1 | 12/2005 | Sakakura | |
| 6,985,901 B1 | 1/2006 | Sachse et al. | |
| 6,988,126 B2 | 1/2006 | Wilcock et al. | |
| 7,010,542 B2 | 3/2006 | Trappen et al. | |
| 7,013,344 B2 | 3/2006 | Megiddo | |
| 7,020,254 B2 | 3/2006 | Phillips | |
| 7,023,979 B1 * | 4/2006 | Wu et al. | 379/265.11 |
| 7,039,176 B2 * | 5/2006 | Borodow et al. | 379/265.02 |
| 7,043,007 B2 * | 5/2006 | McPartlan et al. | 379/265.02 |
| 7,047,192 B2 | 5/2006 | Poirier | |
| 7,050,566 B2 * | 5/2006 | Becerra et al. | 379/265.12 |
| 7,062,031 B2 | 6/2006 | Becerra et al. | |
| 7,068,775 B1 * | 6/2006 | Lee | 379/265.02 |
| 7,072,966 B1 | 7/2006 | Benjamin et al. | |
| 7,076,051 B2 | 7/2006 | Brown et al. | |
| 7,100,200 B2 | 8/2006 | Pope et al. | |
| 7,103,562 B2 * | 9/2006 | Kosiba et al. | 705/10 |
| 7,110,525 B1 * | 9/2006 | Heller et al. | 379/265.11 |
| 7,117,193 B1 | 10/2006 | Basko et al. | |
| 7,127,058 B2 * | 10/2006 | O'Connor et al. | 379/265.01 |
| 7,133,520 B1 | 11/2006 | Doyle et al. | |
| 7,136,873 B2 | 11/2006 | Smith et al. | |
| 7,142,666 B1 | 11/2006 | Bates et al. | |
| 7,149,733 B2 | 12/2006 | Lin et al. | |
| 7,155,612 B2 | 12/2006 | Licis | |
| 7,158,628 B2 * | 1/2007 | McConnell et al. | 379/265.02 |
| 7,162,469 B2 | 1/2007 | Anonsen et al. | |
| 7,165,075 B2 | 1/2007 | Harter et al. | |
| 7,170,976 B1 | 1/2007 | Keagy | |
| 7,170,992 B2 | 1/2007 | Knott et al. | |
| 7,177,401 B2 | 2/2007 | Mundra et al. | |
| 7,200,219 B1 | 4/2007 | Edwards et al. | |
| 7,203,655 B2 | 4/2007 | Herbert et al. | |
| 7,212,625 B1 | 5/2007 | McKenna et al. | |
| 7,215,744 B2 | 5/2007 | Scherer | |
| 7,246,371 B2 | 7/2007 | Diacakis et al. | |
| 7,257,597 B1 | 8/2007 | Pryce et al. | |
| 7,266,508 B1 | 9/2007 | Owen et al. | |

(56) References Cited

U.S. PATENT DOCUMENTS

| | | | |
|---|---|---|---|
| 7,269,253 B1* | 9/2007 | Wu et al. | 379/265.11 |
| 7,272,223 B2* | 9/2007 | McCormack et al. | 379/265.09 |
| 7,283,805 B2 | 10/2007 | Agrawal | |
| 7,295,669 B1 | 11/2007 | Denton et al. | |
| 7,299,259 B2* | 11/2007 | Petrovykh | 709/205 |
| 7,346,532 B2* | 3/2008 | Kusama et al. | 705/8 |
| 7,372,857 B1 | 5/2008 | Kappler et al. | |
| 7,372,952 B1 | 5/2008 | Wu et al. | |
| 7,373,309 B2 | 5/2008 | Nishikawa et al. | |
| 7,376,127 B2 | 5/2008 | Hepworth et al. | |
| 7,382,773 B2 | 6/2008 | Schoeneberger et al. | |
| 7,392,402 B2 | 6/2008 | Suzuki | |
| 7,406,098 B2 | 7/2008 | Taneja et al. | |
| 7,409,423 B2 | 8/2008 | Horvitz et al. | |
| 7,418,093 B2 | 8/2008 | Knott et al. | |
| 7,418,094 B2 | 8/2008 | Golitsin et al. | |
| 7,478,051 B2 | 1/2009 | Nourbakhsh et al. | |
| 7,526,440 B2 | 4/2009 | Walker et al. | |
| 7,545,925 B2 | 6/2009 | Williams | |
| 7,551,602 B2* | 6/2009 | Whitman, Jr. | 370/352 |
| 7,558,383 B2 | 7/2009 | Shtivelman et al. | |
| 7,567,653 B1 | 7/2009 | Michaelis | |
| 7,725,339 B1 | 5/2010 | Aykin | |
| 7,899,177 B1 | 3/2011 | Bruening et al. | |
| 2001/0011228 A1* | 8/2001 | Shenkman | 705/14 |
| 2001/0040887 A1 | 11/2001 | Shtivelman et al. | |
| 2002/0012186 A1 | 1/2002 | Nakamura et al. | |
| 2002/0019829 A1 | 2/2002 | Shapiro | |
| 2002/0021307 A1 | 2/2002 | Glenn et al. | |
| 2002/0029213 A1 | 3/2002 | Borissov et al. | |
| 2002/0035605 A1 | 3/2002 | McDowell et al. | |
| 2002/0038422 A1 | 3/2002 | Suwamoto et al. | |
| 2002/0065894 A1 | 5/2002 | Dalal et al. | |
| 2002/0076010 A1 | 6/2002 | Sahai | |
| 2002/0085701 A1 | 7/2002 | Parsons et al. | |
| 2002/0087630 A1 | 7/2002 | Wu | |
| 2002/0112186 A1 | 8/2002 | Ford et al. | |
| 2002/0116336 A1 | 8/2002 | Diacakis et al. | |
| 2002/0116461 A1 | 8/2002 | Diacakis et al. | |
| 2002/0184069 A1* | 12/2002 | Kosiba et al. | 705/8 |
| 2003/0016812 A1 | 1/2003 | Rodenbusch et al. | |
| 2003/0026414 A1 | 2/2003 | Baker et al. | |
| 2003/0028621 A1 | 2/2003 | Furlong et al. | |
| 2003/0073440 A1 | 4/2003 | Mukherjee et al. | |
| 2003/0093465 A1 | 5/2003 | Banerjee et al. | |
| 2003/0095652 A1 | 5/2003 | Mengshoel et al. | |
| 2003/0108186 A1 | 6/2003 | Brown et al. | |
| 2003/0144900 A1 | 7/2003 | Whitmer | |
| 2003/0144959 A1 | 7/2003 | Makita | |
| 2003/0152212 A1 | 8/2003 | Burok et al. | |
| 2003/0154184 A1 | 8/2003 | Chee et al. | |
| 2003/0165223 A1 | 9/2003 | Timmins et al. | |
| 2003/0169870 A1 | 9/2003 | Stanford | |
| 2003/0182310 A1 | 9/2003 | Charnock et al. | |
| 2003/0215083 A1* | 11/2003 | McPartlan et al. | 379/265.02 |
| 2003/0231647 A1 | 12/2003 | Petrovykh | |
| 2003/0231757 A1 | 12/2003 | Harkreader et al. | |
| 2004/0008828 A1 | 1/2004 | Coles et al. | |
| 2004/0010437 A1* | 1/2004 | Kiran et al. | 705/8 |
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1* | 3/2004 | Busey et al. | 379/265.09 |
| 2004/0103324 A1 | 5/2004 | Band | |
| 2004/0138944 A1 | 7/2004 | Whitacre et al. | |
| 2004/0162998 A1 | 8/2004 | Tuomi et al. | |
| 2004/0202309 A1 | 10/2004 | Baggenstoss et al. | |
| 2004/0210475 A1 | 10/2004 | Starnes et al. | |
| 2004/0230675 A1 | 11/2004 | Freimuth et al. | |
| 2004/0260706 A1 | 12/2004 | Anonsen et al. | |
| 2005/0004828 A1* | 1/2005 | deSilva et al. | 705/9 |
| 2005/0013428 A1* | 1/2005 | Walters, Jr. | 379/266.08 |
| 2005/0021529 A1 | 1/2005 | Hodson et al. | |
| 2005/0041580 A1 | 2/2005 | Petrovykh | |
| 2005/0043986 A1* | 2/2005 | McConnell et al. | 705/11 |
| 2005/0044375 A1 | 2/2005 | Paatero et al. | |
| 2005/0065837 A1* | 3/2005 | Kosiba et al. | 705/9 |
| 2005/0086290 A1 | 4/2005 | Joyce et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0129212 A1* | 6/2005 | Parker | 379/265.03 |
| 2005/0129217 A1* | 6/2005 | McPartlan et al. | 379/266.08 |
| 2005/0135593 A1 | 6/2005 | Becerra et al. | |
| 2005/0135600 A1* | 6/2005 | Whitman, Jr. | 379/266.08 |
| 2005/0135601 A1* | 6/2005 | Whitman, Jr. | 379/266.08 |
| 2005/0138064 A1 | 6/2005 | Trappen et al. | |
| 2005/0154708 A1 | 7/2005 | Sun | |
| 2005/0165930 A1* | 7/2005 | Whitman, Jr. | 709/226 |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0045255 A1 | 3/2006 | Peters et al. | |
| 2006/0056598 A1 | 3/2006 | Brandt et al. | |
| 2006/0072739 A1 | 4/2006 | Baggenstoss et al. | |
| 2006/0135058 A1 | 6/2006 | Karabinis | |
| 2006/0177069 A1 | 8/2006 | Critchley et al. | |
| 2006/0178994 A1 | 8/2006 | Stolfo et al. | |
| 2006/0242610 A1 | 10/2006 | Kanchwalla et al. | |
| 2006/0256957 A1 | 11/2006 | Fain et al. | |
| 2006/0271418 A1 | 11/2006 | Hackbarth et al. | |
| 2007/0038632 A1 | 2/2007 | Engstrom | |
| 2007/0064912 A1 | 3/2007 | Kagan et al. | |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0192414 A1 | 8/2007 | Chen et al. | |
| 2007/0201311 A1 | 8/2007 | Olson | |
| 2007/0201674 A1 | 8/2007 | Annadata et al. | |
| 2007/0230681 A1 | 10/2007 | Boyer et al. | |
| 2008/0056165 A1* | 3/2008 | Petrovykh | 370/270 |
| 2008/0275751 A1 | 11/2008 | Flockhart et al. | |
| 2008/0275752 A1 | 11/2008 | Flockhart et al. | |
| 2008/0275766 A1 | 11/2008 | Flockhart et al. | |
| 2009/0193050 A1 | 7/2009 | Olson | |
| 2010/0322407 A1 | 12/2010 | Erhart et al. | |

FOREIGN PATENT DOCUMENTS

| | | |
|---|---|---|
| EP | 0 899 673 A2 | 3/1999 |
| EP | 0 998 108 A1 | 5/2000 |
| EP | 1035718 | 9/2000 |
| EP | 1075130 | 2/2001 |
| EP | 1 091 307 A2 | 4/2001 |
| EP | 1 150 236 A2 | 10/2001 |
| EP | 1246097 | 10/2002 |
| JP | 06-019861 | 1/1994 |
| JP | H7-005907 | 1/1995 |
| JP | 2001-053843 | 2/2001 |
| JP | 2001-077922 | 3/2001 |
| JP | 2002-051149 | 2/2002 |
| JP | 2002-297900 | 10/2002 |
| JP | 2006-054864 | 2/2006 |
| WO | WO 99/17522 | 4/1999 |
| WO | WO 01/80094 | 10/2001 |
| WO | WO 02/099640 | 12/2002 |

OTHER PUBLICATIONS

Evenson et al., Effective Call Center Management: Evidence from Financial Services, The Wharton Financial Institutions Center, Jan. 1999.

Eder, Johann et al. "Time Management in Workflow Systems." BIS'99 3rd International Conference on Business Information Systems (1999).

U.S. Appl. No. 12/022,850, filed Jan. 30, 2008, Flockhart et al.

Rabun, Andy and Jim Sommers. "Microsoft Project 98 Support Course", Microsoft Corporation. Jun. 1998, 879 pages.

"Microsoft Project 2000 Training Manual", Microsoft Corporation. 2000, 431 pages.

Background of the Invention.

U.S. Appl. No. 09/420,912, filed Oct. 20, 1999, J.A. Ford.

(56) References Cited

OTHER PUBLICATIONS

Spraetz, Out with the new, in with the old: A look at scheduling alternatives, Customer Inter@ction Solutions; Nov. 2001: 20,5.
www.EIX.com (1998-2002) (http://web.archive.org/web/20020803000353/http://www.iex.com): Totalview The Workforce Management Solution, TotalView Product Literature: The Perfect Fit.
www.EIX.com (1998-2002) (http://web.archive.org/web/20020803000353/http://www.iex.com): Totalview The Workforce Management Solution, TotalView Product Literature: TotalView's Agent Webstation.
Business Editors, Microdyne Outsourcing Rolls Out RightForce Workforce Management to Manage Bi-Coastal Contact Center and E-Services Staff Business Wire. New York: Dec. 4, 2001. p. 1.
Business Editors, High Tech Editors. IEX Enhances Award-Winning Workforce Management Solution Business Wire. New York: Jul. 31, 2001. p. 1.
Morris et al., Sardine: Dynamic Seller Strategies in an Auction Marketplace, EC'OO, ACM, Oct. 17-20, 2000, p. 128-134.
Microsoft Corporation. "User's Guide: Microsoft Project: Business Project Planning System Version 4.1 for Windows 95 or Version 4.0 for Windows 3.1." 1995. pp. 1-40 (Chapters 1-4).
Dinda, Peter A., "A Prediction-based Real-time Scheduling Advisor", 2002, pp. 1-8.
Official Action for U.S. Appl. No. 12/571,031, mailed Apr. 1, 2010, 70 pages.
Official Action for U.S. Appl. No. 12/571,031, mailed Apr. 9, 2013 27 pages.
Official Action for U.S. Appl. No. 12/571,031, mailed Jul. 10, 2013 27 pages.
US 6,537,685, 3/18/2003, Fisher et al. (withdrawn).
U.S. Appl. No. 11/199,828, filed Aug. 8, 2005, Bland et al.
U.S. Appl. No. 11/242,687, filed Oct. 3, 2005, Krimstock et al.
U.S. Appl. No. 11/245,724, filed Oct. 6, 2005, Flockhart et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
U.S. Appl. No. 12/242,916, filed Oct. 1, 2008, Kiefhaber et al.
"Avaya IQ—Building Upon the Strengths of CMS", White Paper, Feb. 2007, 11 pages.
"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.
"Driving Model Agent Behaviors With Avaya IQ", White Paper, Apr. 2007, 12 pages.
"Kana—Contact Center Support", available at http://www.kana.com/solutions.php?tid=46, copyright 2006, 3 pages.
"Monitoring: OneSight Call Statistics Monitors", available at http://www.empirix.com/default.asp?action=article&ID=301, date unknown, printed May 10, 2007, 2 pages.
"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).
"Still Leaving It to Fate?: Optimizing Workforce Management", Durr, William Jr., Nov. 2001.
Aspect—"Analysis and Reporting," http://aspect.com/products/analysis/index.cfm, (Copyright 2005) (1page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
Avaya—"Basic Call Management System Reporting Desktop," Product Overview, http://www.avaya.com/gcm/master-usa/en-us/products/offers/bcmrs_desktop.htm (Copyright 2005) (2 pages).
Avaya—"Basic Call Management System Reporting Desktop," Product Technical, http://www.avaya.com/gcm/master-usa/en-us/products/offers/bcmrs_desktop.htm (Copyright 2005) (2 pages).
Avaya—"Call Management System," Product Description, http://www.avaya.com/gcm/master-usa/en-us/products/offers/call_management_system.htm (Copyright 2005) (2 pages).
Avaya—"Call Management System," Product Features, http://www.avaya.com/gcm/master-usa/en-us/products/offers/call_management_system.htm (Copyright 2005) (3 pages).
Avaya—"Call Management System," Product Overview, http://www.avaya.com/gcm/master-usa/en-us/products/offers/call_management_system.htm (Copyright 2005) (2 pages).
Avaya—"Call Management System," Product Technical, http://www.avaya.com/gcm/master-usa/en-us/products/offers/call_management_system.htm (Copyright 2005) (2 pages).
Avaya—"Multi Channel Product Authorization," (PA) Version 5.0, (Nov. 2003) (6 pages).
Avaya IQ "Introducing Reporting and Analytics As You Designed It", 2007, 4 pages.
Definity Communications System Generic 3 Call Vectoring/Expert Agent Selection (EAS) Guide, AT&T publication No. 555-230-520 (Issue 3, Nov. 1993).
Nortel—"Centrex Internet Enabled Call Centers," http://www.products.nortel.com/go/product_assoc.jsp?segId=0&parID=0&catID=-9191&rend_id . . . (Copyright 1999-2005) (1page).
Official Action for U.S. Appl. No. 12/571,031, mailed Sep. 15, 2010, 20 pages.
Official Action for U.S. Appl. No. 12/571,031, mailed Nov. 23, 2012 20 pages.

\* cited by examiner

METHOD AND APPARATUS FOR SUPPORTING INDIVIDUALIZED SELECTION RULES FOR RESOURCE ALLOCATION

FIELD OF THE INVENTION

The present invention is related to the allocation of resources using individualized selection rules. In particular, the present invention is directed to matching resources and work entries in accordance with individualized selection rules.

BACKGROUND OF THE INVENTION

Resource allocation systems have been developed for assigning work entries to resources according to various criteria. For example, customer contact centers receive requests for assistance or inquiries from customers, and distribute those requests and inquiries to agents. Such systems may attempt to distribute work (e.g., requests for assistance or inquiries) to resources (e.g., agents) by placing work entries corresponding to available work into a queue established for work entries having selected attributes. All agents within a given service or skill must use the same rules for selecting work from that service's work queue.

The assignment of work entries into queues allows work to be allocated to resources based on narrowly defined services. However, such systems do not allow for the individualized selection of a work entry from within a queue established for a service. Instead, a single set of selection rules for the queue is applied to determine the next work entry that is assigned to a resource. For example, the rule for a queue may provide that the work entry that has been in the queue the longest is assigned to the next available resource. Other systems may search across the top row or rows of queues, and assign the first piece of work meeting the selection criteria to the resource. Therefore, such systems do not consider every piece of work in a queue. Accordingly, conventional work allocation systems are incapable of automatically assigning work to resources based on the unique capabilities of the resources to which work from a particular queue may be assigned and based on the unique aspects of individual work entries within the queue, after consideration of each work entry in the queue.

Other systems generate scores in order to correlate the requirements of a work item to the abilities of an agent. However, such systems have been limited to using a single set of attributes for correlating work items and agents. In particular, such systems have used an assigned skill level to match work items to agents. Furthermore, although such systems may allow management preferences to be considered in assigning a piece of work, such preferences are considered only if the scores generated for two or more agents with respect to that piece of work are the same, or if skill is not being considered in assigning work. Furthermore, conventional systems have been limited to selection criteria based on attributes or characteristics of the work or resource themselves, and have not searched every available item. Accordingly, systems have been limited in the criteria that can be applied to match work items to a resource.

Still other resource allocation systems provide a display of possible or qualifying work items to an agent, and let the agent select which work item to service next. Such systems do not automatically assign work to agents based on the unique capabilities of agents or the unique aspects of work entries.

SUMMARY OF THE INVENTION

The present invention is directed to solving these and other problems and disadvantages of the prior art. According to embodiments of the present invention, there is a resource entry corresponding to at least each available resource within a work allocation system. When a resource arrives, a work selection rule or set of rules is used to determine which available work item the resource is assigned to by comparing the work selection rule or rules to one or more characteristics of the available work items. The work selection rule need not relate to the characteristics of the resource with which the rule is associated. More particularly, different sets of work selection rules may be applied in response to changing environmental conditions. Furthermore, the work selection rule may comprise a work validation rule and a work preference rule. Each resource may have a different set or combination of work validation rules and work preference rules. In addition, there is a work entry corresponding to each work item that is received. When a work item arrives, a resource selection rule or set of rules is used to determine which available resource the work item is assigned to by comparing the resource selection rule or rules to one or more characteristics of the available resources. The resource selection rule need not be related to the characteristics of the work item with which the rule is associated. More particularly, different sets of resource selection rules may be applied in response to changing environmental conditions. Furthermore, the resource selection rule may comprise a resource validation rule and a resource preference rule. Each work entry may have a different set or combination of resource validation rules and resource preference rules.

In accordance with other embodiments of the present invention, each resource may be associated with one or more work selection rules and each work item may be associated with one or more resource selection rules. When a resource becomes available, a work entry may be allocated to that resource based on the capability of the resource to perform the work required by the work entry, or on other criteria, as determined by a comparison of the resource's work selection rule or rules to the work entry's resource selection rule or rules. Similarly, when a work entry becomes available, it can be assigned to a resource according to the requirements of the work entry, or according to other criteria, and the capabilities of the resource, as determined by a comparison of the work entry resource selection rule or rules to the resource's work selection rule or rules.

According to embodiments of the present invention, one or more work entry pools are established for work entries that have arrived at a work allocation system and that have not yet been assigned to a resource. In accordance with embodiments of the present invention, work entry pools comprise general categories or classifications of work. Work entries within a pool are not prioritized with respect to other work entries within that pool (i.e., they are not queued). When a resource becomes available, each work entry in every pool from which the available resource may be validly assigned work is considered as a candidate for assignment to the resource. After all such work entries have been considered, the work entry (or a select number of work entries) having characteristics best matching the work selection rules associated with the resource is assigned to the resource for handling.

In accordance with further embodiments of the present invention, resource pools are established for resource entries corresponding to available resources. In general, the resource pools categorize resources according to the characteristics of the resources. Resource entries within a pool are not prioritized with respect to other resource entries within that pool (i.e., they are not queued). When a work item arrives at the system, each resource in every resource pool from which a resource may be validly selected for handling the work item is considered. After all of the resources have been considered, the resource having characteristics that best meet the resource selection rules associated with the work entry is assigned to service that work entry.

In accordance with additional embodiments of the present invention, when a resource can validly service a number of work entries, those work entries are scanned and scored according to the resource's work preference rule or rules. In particular, the work preference rule or rules associated with the resource are used to generate a score based on each work entry's characteristics or on each work entry's resource preference rules. The work entry for which the highest score is calculated is then assigned to the resource. In accordance with still other embodiments of the present invention, valid work entries are scored according to a comparison of the valid work entries' characteristics or resource preference rules and the resource's characteristics or work preference rule or rules, and the resource is automatically assigned multiple highest scoring work entries. In accordance with such embodiments, the resource may be allowed to choose a particular work entry, or multiple work entries, from a selected number of the highest scoring work entries.

In accordance with still other embodiments of the present invention, when a resource validation rule or rules associated with a work item makes that work item available to a number of resources within a service, each such resource entry is validated, scanned, and scored. In particular, the resource preference rules associated with the work item are used to generate a score based on the characteristics or the work entry preference rules associated with each of the valid resources. The resource entry with the highest score is then assigned to the work item.

Furthermore, in accordance with embodiments of the present invention, parameters associated with a particular resource entry or work entry can be different for each work entry or resource in a pool. In addition, the rules or parameters associated with a resource entry or work entry can be changed dynamically and in real-time. Furthermore, changes to parameters or rules may be made in response to detected changes in environmental conditions. Accordingly, the present invention is capable of matching work entries and agents according to any desired criteria.

These and other advantages and features of the invention will become more apparent from the following description of illustrative embodiments of the invention, taken together with the drawings.

DETAILED DESCRIPTION

Figure 1:
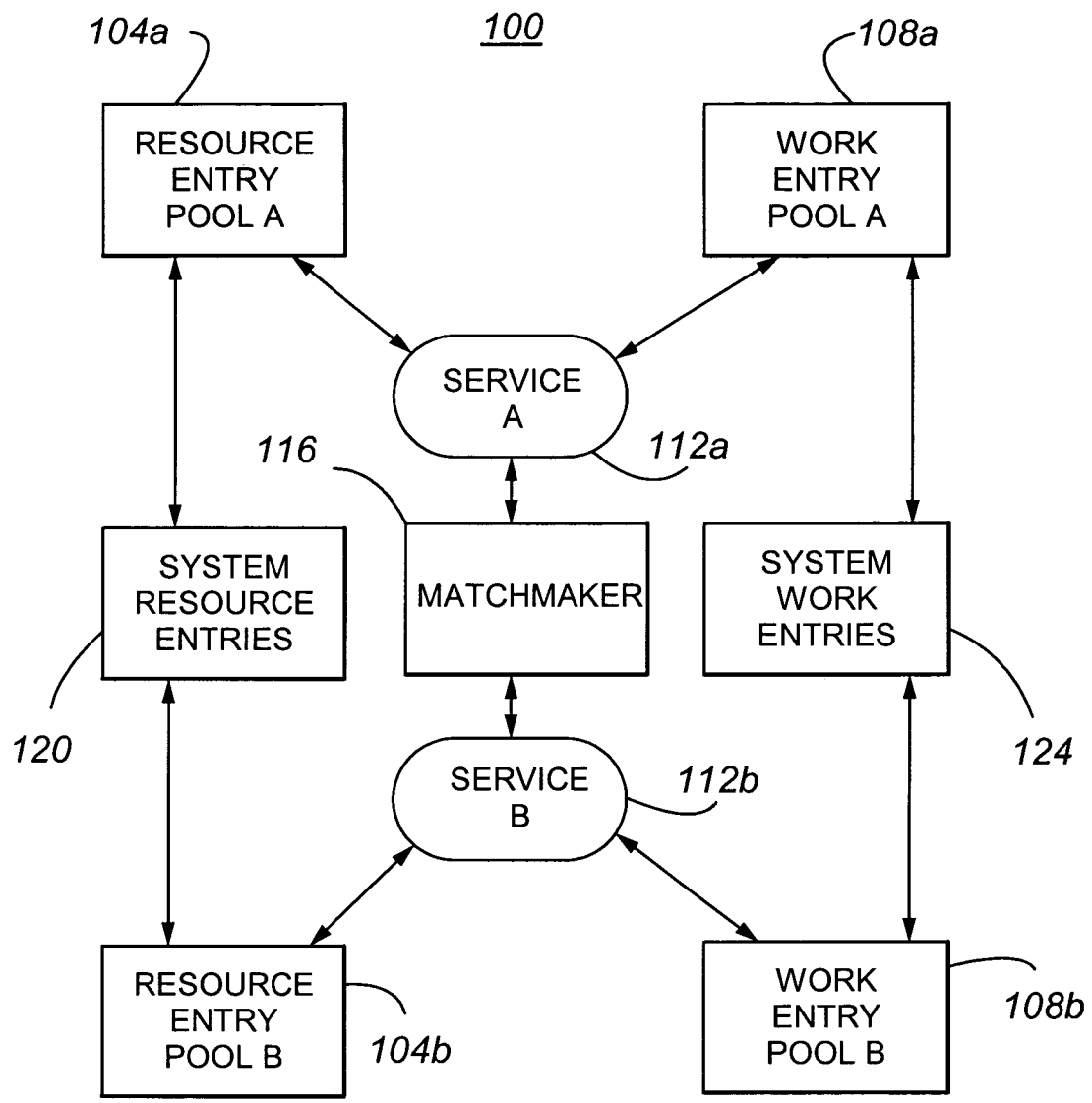
FIG. 1 is a block diagram depicting a system for allocating resources in accordance with an embodiment of the present invention.

With reference now to FIG. 1, a resource allocation system 100 in accordance with an embodiment of the present invention is depicted. As shown in FIG. 1, the resource allocation system 100 generally includes a resource entry pool 104 and a work entry pool 108 for each of one or more services 112, and a matchmaker 116. For example, in a system having multiple services 112 (e.g., services 112a and 112b), a like number of corresponding resource entry pools 104 (e.g., resource entry pools 104a and 104b) and work entry pools 108 (e.g., work entry pools 108a and 108b) may be provided.

In accordance with an embodiment of the present invention, the resource entry pools 104 may include an unordered collection of one or more resource entries that each contain information regarding a resource available for performing work drawn from system resource entries 120. As described in greater detail below, the information regarding available resources maintained as part of the system resource entries 120 may include or specify resource parameters. The resource parameters may comprise resource characteristics, or work selection rules, which may include service validity rules, work validity rules, and work preference rules for each such available resource.

The work entry pools 108 may include an unordered collection of one or more work entries that each contain information regarding a work item drawn from system work entries 124. That is, each work entry corresponds to a work item that requires a service available from a resource associated with the work allocation system 100. As described in greater detail below, the information regarding available work entries maintained as part of the system work entries 124 may include or specify work item parameters. The work item parameters may comprise work item characteristics, or resource selection rules, which may include resource validation rules and resource preference rules. The resource selection rules may comprise requirements for each work entry requiring a service 112.

The parameters associated with a resource or a work item can be varied in response to changing environmental conditions. For example, work selection rules in a resource entry or resource selection rules in a work entry may be altered in response to changed system goals or operating parameters. Furthermore, such changes may be implemented in real-time or in substantially real-time. As can be appreciated by one of skill in the art from the description provided herein, embodiments of the present invention allow such dynamic implementation of altered selection rules because they group work entries and/or resource entries into pools, and not in ordered queues. More particularly, because each work entry in a pool is considered for assignment when a resource becomes available, and because each resource entry in a pool is considered for assignment when a work entry becomes available, rule changes can be made at run-time. Such aspects of embodiments of the present invention also allow selection rules to be customized for particular resources or work items. In particular, resources and work items can be treated on a truly individual basis, rather than simply as part of larger categories. Examples of environmental conditions that might prompt changes in applied selection rules include service loads on the system, whether a request for service is received on a holiday or outside of normal business hours, the capabilities of resources available to the system, the goals of supervisors on duty at a particular point in time, the current goals or policies of an enterprise operating the system, information affecting system knowledge as to the capabilities of a resource or needs of a work item, or any other condition in response to which a change in how work is paired to a resource may be desired.

The matchmaker 116 generally assigns an available work item represented in a work entry pool 108 to an available resource represented in a corresponding resource entry pool 104. In accordance with an embodiment of the present invention, a first one of a work item and a resource is assigned to a second one of a work item and a resource according to the validation and preference rules associated with the first one and the characteristics of the second one. In accordance with other embodiments of the present invention, a work item is assigned to a resource according to work validation rules and work preference rules for the resource, and resource validation rules and resource preference rules associated with the work item. As will be appreciated from the description provided herein, a work item will typically be represented by a corresponding work entry in the work entry pool 108 of only one service 112, while a resource may have a corresponding resource entry in resource entry pools 104 for a number of services.

Figure 2:
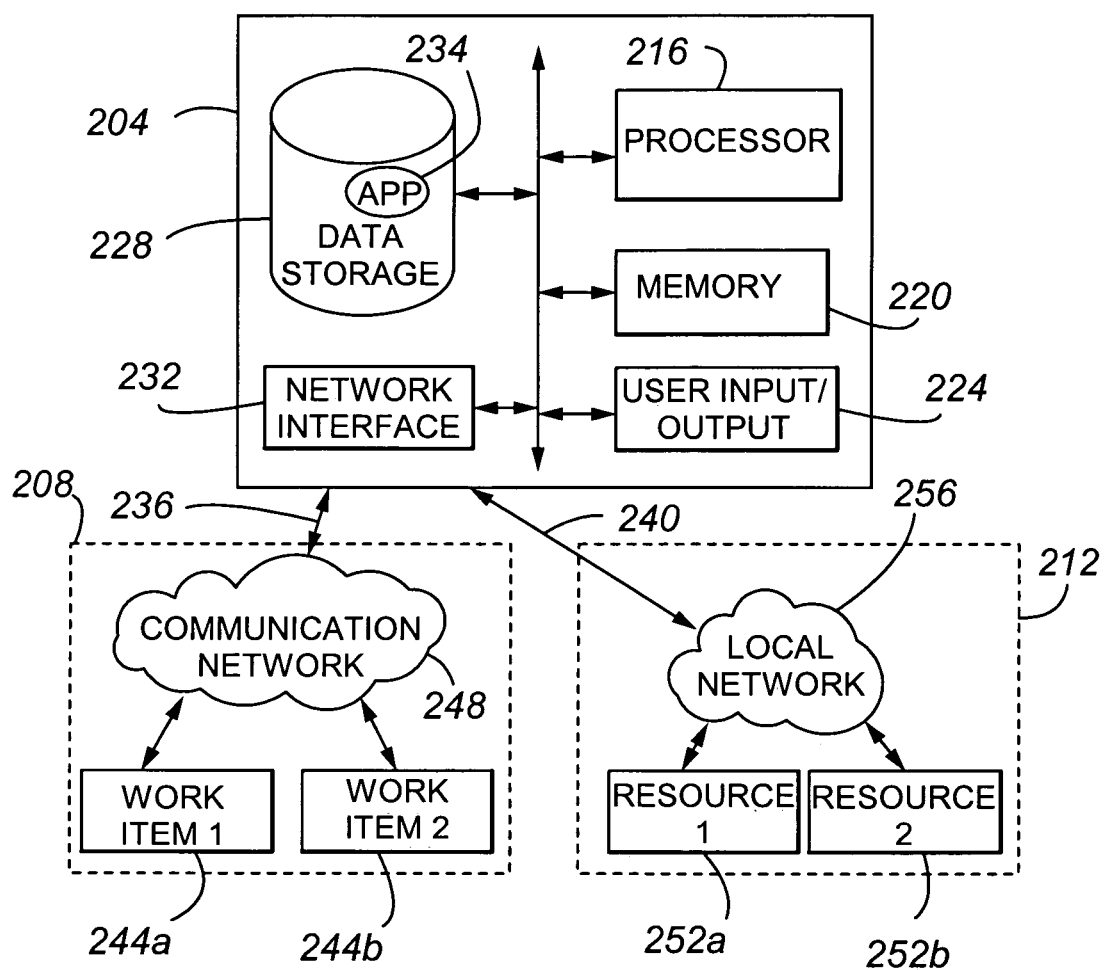
FIG. 2 is a block diagram depicting the components of a system for allocating resources in accordance with an embodiment of the present invention.

With reference now to FIG. 2, the components of a resource allocation system 100 in accordance with an embodiment of the present invention are depicted in block diagram form. In general, the system 100 may include a server 204, a source of work items 208, and a source of resources 212 capable of performing work received from the source of work items 208.

The server 204 may comprise a general purpose computer server. For example, the server 204 may comprise a general purpose computer running a Windows operating system. As yet another example, the server 204 may comprise a call center server. As still another example, the server 204 may incorporate the functions of a telecommunications switch. As shown in FIG. 2, the server 204 may comprise a processor 216, memory 220, user input/output devices 224, data storage 228, and a network interface 232.

The processor 216 may include any processor capable of performing instructions encoded in software. In accordance with another embodiment of the present invention, the processor 216 may comprise a controller or application specific integrated circuit (ASIC) having and capable of performing instructions encoded in logic circuits. For example, the processor 216 may perform or execute software or encoded instructions implementing the matchmaker 116 function (i.e., performing the allocation determination functions) of the system 100. The memory 220 may be used to store programs or data in connection with the running of programs or instructions on the processor 216. In addition, the resource entry pool or pools 104, the work entry pool or pools 108, the system resource entries 120, and/or the system work entries 124 may be established in the memory 220, in whole or in part. The user input/output devices 224 may include visual displays, audio output, keyboards, pointing devices or any other devices for facilitating the receipt of instructions or data from a user and the provision of output to the user, such as a system administrator. The data storage 228 may generally include storage for programs and data. For example, the data storage 228 may store validation rules and preference rules for each resource 252, work entry 244, and service 112 associated with the system 100. In addition, the data storage 228 may store a matchmaker application 234, for instance where the matchmaker 116 function is encoded in software. The data storage 228 may also be used to store data comprising the resource pool or pools 104, the system resource entries 120, the system work entries 124, services 112, and the work pool or pools 108. The network interface 232 may provide an interconnection between the server 204 and the source of work items 208 over a first communication channel or link 236 and with the source of resources 212 over a second communication channel or link 240. As can be appreciated by one of skill in the art, a different network interface 232 may be provided for each communication channel 236, 240 with which the server 204 is interconnected. Furthermore, the communication channels 236, 240 may comprise a single communication channel or link, for example where the server 204 is interconnected to a source of work items 208 and to a source of resources 212 through an Internet protocol network.

The source of work items 208 may include a plurality of work items 244. The work items 244 may comprise or be associated with entities, devices or processes that require access to a resource 252. For example, an entity, device or process associated with a work item 244 may comprise a customer placed in communication with the server 204 through a communication network 248. Accordingly, it should be appreciated that, in accordance with embodiments of the present invention, a Work item 244 may comprise a person requesting information or assistance by contacting a server 204 comprising a call center using a telephone or a client computer. Furthermore, the communication network 248 through which an entity, device or process associated with a work item 244 is placed in communication with the server 204 may comprise the public switched telephone network (PSTN). According to alternative or additional embodiments of the present invention, the communication network 248 may comprise a computer network over which an entity, device or process associated with a work item 244 is interconnected to the server 204, and over which data, including voice data or textual data, is transmitted. For example, the communication network 248 may comprise the Internet. Although only two work items 244a and 244b are shown in FIG. 2, it should be appreciated that other numbers of work items 244 can be supported. Also, it should be appreciated that according to embodiments of the present invention, different work items may be interconnected to the server 204 over different communication networks 248.

The source of resources 212 generally includes a plurality of resources 252. The resources 252 may comprise human agents. According to additional or alternative embodiments of the present invention, the resources 252 may comprise computer processor resources or communication resources. The resources 212 may be interconnected to the server 204 through a local network 256. Although only two resources 252a and 252b are illustrated in FIG. 2, it should be appreciated that other numbers of resources 252 may be supported.

In an exemplary embodiment of the system 100, the server 204 comprises a private branch exchange (PBX), the local network 256 comprises an Internet protocol network, the communication network 248 comprises the PSTN and/or the Internet, and the resources 252 comprise human agents using telephones or computers to communicate with assigned work items 244 comprising human customers using text or voice communications established via telephones or computers. According to still other embodiments of the present invention, the communication network 248 and the local network 256 may comprise a common network, such as the Internet.

Figure 3:
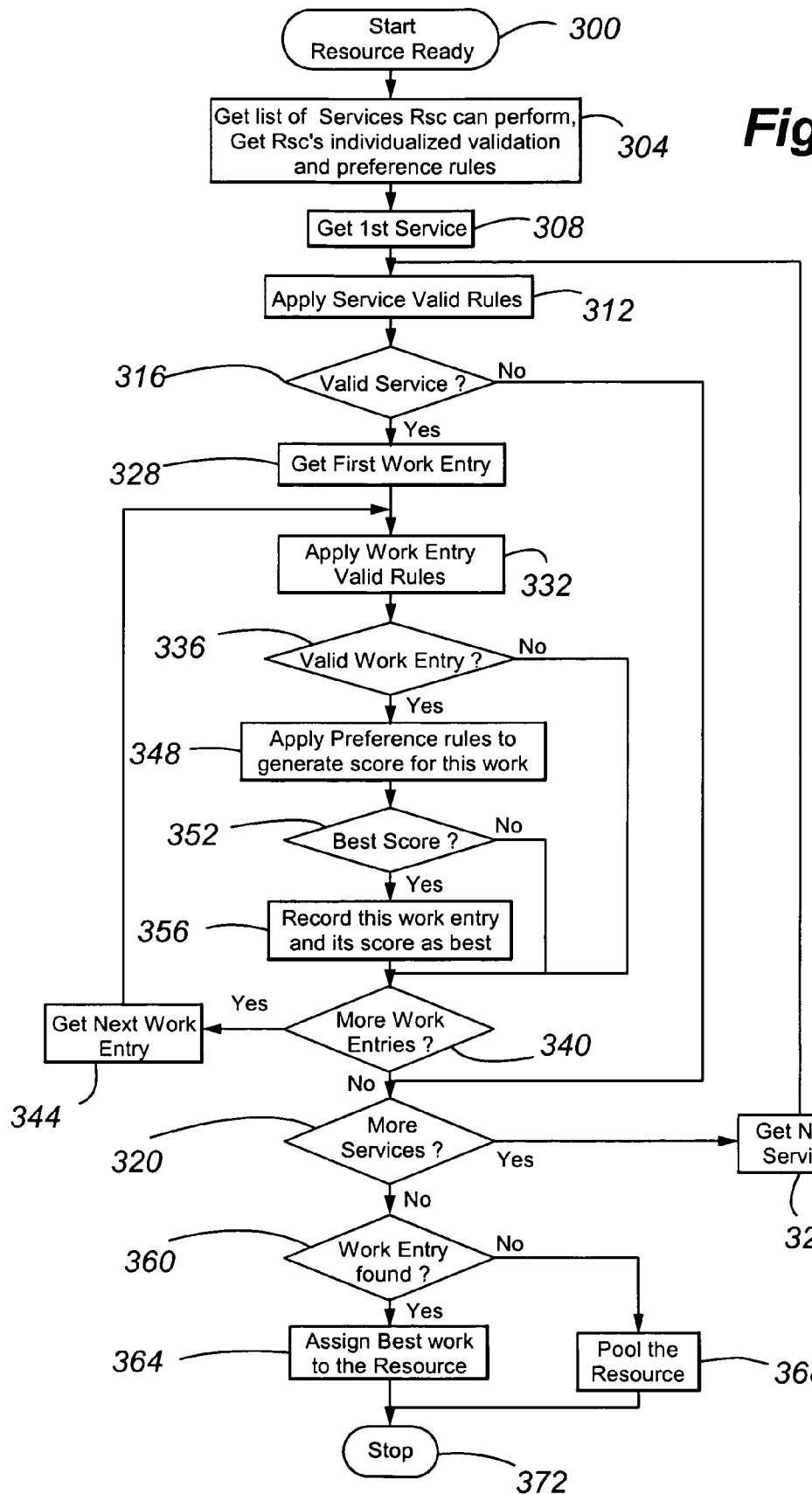
FIG. 3 is a flow chart depicting the operation of a system in accordance with an embodiment of the present invention in response to a resource becoming available.

With reference now to FIG. 3, the allocation of one of a plurality of work items 244 to an available resource 252 is illustrated. Initially, at step 300, a resource 252 becomes available or is received. Next, at step 304, a list of services (service validation rules) and types or categories of work (work validation rules) that the resource 252 can or is permitted to perform, and the individualized work preference rules for that resource 252, as represented by that resource's corresponding resource entry, are obtained. For example, a resource entry corresponding to the available resource 252 is received. In accordance with an embodiment of the present invention, the service validation rules for a resource 252 define broad categories of duties that the resource is able to perform and that are within the resource's assigned duties. In accordance with another embodiment of the present invention, the administered capabilities of a resource 252, as set forth in a resource entry, define broad categories of duties that a resource is able to perform, and the validation rules are more detailed and specific. For example, a service 112 might be considered valid for a given resource 252 only when its state is greater than a particular level, valid only when the service level target for the service 112 is not being met, or valid for a particular period of time during the day. In the exemplary context of a customer contact center in which resources 252 comprise human agents, a first service (e.g., service 112a) may include responding to inquiries regarding selected services or products available from the provider of the resource 252 (e.g., the operator of the work allocation system 100) received from potential customers, and a second service (e.g., service 112b) may include responding to inquiries from existing customers regarding selected services or products.

After the list of services that the resource 252 can perform has been obtained, a first service 112 offered in connection with the system 100 is obtained (step 308). At step 312, the service validation rules for the resource are applied to the first service 112 (e.g., service 112a). At step 316, a determination is made as to whether the service 112 is valid. If the service 112 is not valid, a determination is made as to whether more services are available (step 320). If more services are available, the system 100 gets the next service 112 (e.g., service 112b) (step 324), and the service validity rules are applied (step 312) to determine the validity of the next service 112 (step 316).

If the service 112 is determined at step 316 to be valid, the system 100 gets the first work entry (step 328) from the service's work entry pool 108. Next, at step 332, the work validation rules for the resource 252 set forth in the resource entry for that resource 252 are applied to the first work entry, and in particular to the characteristics of that work entry. The work validation rules associated with a resource 252 may be unique to that resource. The work validation rules may be applied to define the types of work that the resource 252 is qualified to handle and that are within the resource's assigned duties. The work validation rules may be established as categories within a valid service or services 112 for the resource 252. For example, a resource 252 comprising a human agent having good interpersonal skills and who is very knowledgeable regarding the goods or services available from the provider of the resource, and therefore has the skills necessary to handle requests for information regarding all aspects of the business of the provider, may be qualified to handle requests for information from all categories of existing and potential customers. However, because such a resource 252 may be more advantageously reserved for high value customers, the work validation rules associated with that resource 252 and set forth in a corresponding resource entry may be used to assign only calls (i.e., work items 244) associated with high value customers to that resource 252. Similarly, a resource 252 comprising a human agent that is a trainee, and thus relatively inexperienced, may have associated work validation rules that confine the resource's duties to one segment of inquiries (for example, regarding existing accounts of a particular type) and that are placed by relatively low value customers.

It should be appreciated that the particular rules that may be associated with a resource can be changed dynamically in response to changing conditions or system parameters. Furthermore, changes may be applied to a single resource (i.e., changes may be unique to a particular resource). For example, the work validation rules associated with a single resource can be altered at any time and effectively applied. In particular, this ability is enabled by embodiments of the present invention because every work entry associated with a service for which a resource has been determined to be valid is searched or considered for assignment to the resource. Accordingly, embodiments of the present invention provide flexibility to system 100 administrators or operators.

In an additional aspect, work validation rules or the selection of work validation rules being applied can be unrelated to characteristics of the resource with which they are associated. For example, different work validation rules may be applied or associated with a resource according to environmental conditions such as the time of day, day of the week, whether the day is a holiday, the capabilities of other resources associated with the system 100 at the time the rule is applied, the service level objectives at the time the rule is applied, the presence or absence of supervisory personnel, the identity of supervisory personnel, or any other criteria. In addition, as will be described in greater detail elsewhere herein, because every work entry in a service that has been determined to be valid for the available resource is considered or scanned, embodiments of the present invention allow unique selection criteria to be applied. For example, a work validation rule that is particular to a resource can be applied effectively, allowing very precise control of work assignments. For example, where a resource has a particular characteristic, such as the ability to communicate using a local dialect, a work entry associated with a request for assistance from someone using that local dialect can be reliably assigned to the resource, even though the resource may validly service other work items. As yet another example, a particular resource may be restricted with respect to the gender of persons represented by work entries that can be assigned to the resource, and this policy can be effectively enforced. Changes to work validation rules can be made at substantially the same time as environmental changes are detected.

In step 336, a determination is made as to whether the work entry is, according to the applicable work validation rules, valid for the resource 252. In general, a work entry is valid for a resource if the work validation rules associated with the resource meet or exceed the requirements of the work item. If the work entry is not valid, a determination is made as to whether more work entries are available from the work entry pool 108 (step 340). If more work entries are available, a next work entry is retrieved from the work entry pool 108 (step 344) and the system returns to step 332.

If the work entry is valid for the resource 252, the work preference rules associated with the resource 252 (i.e. the work preference rules set forth in the resource entry associated with the resource 2.52) are applied to generate a score for the work entry (step 348). The work preference rules associated with a given resource may be unique to that resource 252. The work preference rules are applied to provide the best possible fit between a resource 252 and the work item 244, as determined by the characteristics of the work item or as set forth in the corresponding resource preference rules of the work entry. For example, the particular rules associated with a resource 252 may make it desirable to assign work items 244 having a first set of characteristics to that resource, as specified by an associated resource preference rule or rules, in preference over work items 244 having a second set of characteristics.

For instance, it may be considered desirable to assign a resource having a unique characteristic, such as a unique accent, only to customers from a region where that accent is prevalent. Such selection criteria may be implemented by searching each work item that is valid for the resource. That is, each work entry for which it has been determined that the resource meets the minimum validity requirements is considered to determine the region from which the person associated with the work entry is from. Where such selection criteria is implemented as a work preference rule, a first work entry that is associated with a customer from the region in question may be scored more highly than a second work entry that is identical, except that the second work entry is not associated with a customer from that region.

As another example, it may be considered desirable to assign work items 244 comprising requests for information from female customers to resources 252 comprising female agents in preference over resources 252 comprising male agents. Under such a scenario, a work item 244 having a characteristic indicating that the work item is associated with a female customer that has already been determined to be valid for a resource 252 comprising a female agent will be scored more highly than another valid work item 244 having the characteristic of being associated with a male customer.

Accordingly, rather than simply taking a work entry from the top of a queue established for a particular category of work item 244, the individual characteristics or requirements of work items 244 represented in a work entry pool 108 that may be validly assigned to a resource 252, as expressed by the characteristics of those work items' 244 corresponding work entries, are compared to the individual characteristics of the resource, as expressed by the work preference rule or rules of the resource entry, to determine the desirability of such an assignment. Furthermore, work preference rules are applied to score each work item then available in the work entry pool 108 that can be validly handled by the resource under consideration. That is, a score is generated for each work item having requirements that are met or exceeded by the resource.

In an additional aspect, work preference rules or the selection of work preference rules can be unrelated to the resource with which they are associated. For example, different work preference rules may be applied or associated with a resource according to environmental conditions or any other criteria. Changes to work preference rules can be made at substantially the same time as environmental changes are detected.

At step 352, a determination is made as to whether the score generated for the work item 244 then under consideration is the best score yet obtained. If it is the best score, the work entry for the work item 244 and its score are recorded (step 356). After recording the work entry and its score, or if at step 352 it is determined that the score obtained is not the best score from among the candidate work entries that have already been scored, the system proceeds to step 340 to determine whether more work entries are available. If more work entries are available, the next work entry is obtained (step 344) and the system returns to step 332 to consider the next work entry. If no more work entries are available (i.e. all of the available work entries for the service have been considered), a determination is made as to whether more services 112 are available (step 320). If more services 112 are available, the next service 112 is obtained (step 324) and the system returns to step 312. If no more services 112 are available, a determination is made as to whether a work entry has been found for the resource 252 (step 360). If a work entry has been found, the best work item 244 (i.e., the work item 244 associated with the work entry having the highest score) is assigned to the resource 252 (step 364). If a work entry has not been found for the resource 252, the resource is placed in the resource pool or pools 104 (step 368). After assigning the best work item 244 to the resource 252 (step 364) or placing the resource entry in the resource pool or pools 104 (step 368), the process of assigning a work item 244 to a particular resource 252 ends (step 372).

As can be appreciated by one of skill in the art, the process of assigning a work item 244 to a resource 252 may be initiated each time a resource 252 becomes available. Alternatively or in addition, the process of assigning a work item 244 to a resource 252 may be performed periodically.

Figure 4:
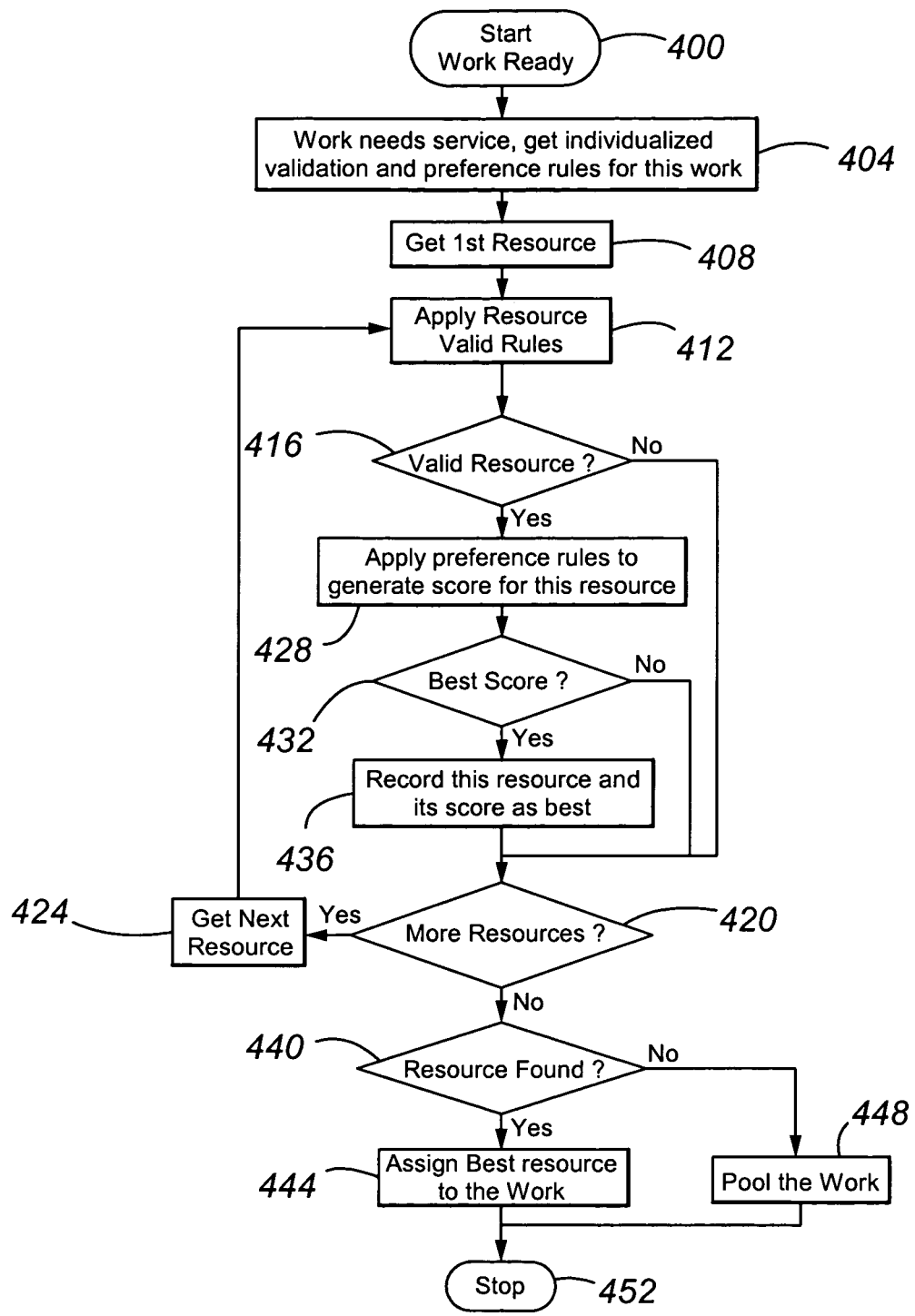
FIG. 4 is a flow chart depicting the operation of a system in accordance with an embodiment of the present invention in response to a work item becoming available.

With reference now to FIG. 4, the process of assigning a work item 244 that becomes available to one of a plurality of resources 252 is illustrated. Initially, at step 400, a work item 244 becomes available or is received. At step 404, individualized resource selection rules associated with the work item 244 are obtained. These resource selection rules may include resource validation rules and resource preference rules that describe particular characteristics of the work item 244 under consideration and that are set forth in a work entry corresponding to the work item 244. Furthermore, it should be appreciated that the resource selection rules associated with the work item 244 may be unique to that work item 244. In addition, it should be appreciated that the resource selection rules need not be divided into resource validation or resource preference rules categories.

It should be appreciated that the particular rules that may be associated with a work item can be changed dynamically in response to changing conditions or system parameters. Furthermore, changes may be applied to a single work item (i.e., changes may be unique to a particular work item). For example, the resource validation rules associated with a single work item can be altered at any time and effectively applied. In particular, this ability is enabled by embodiments of the present invention because every resource entry that is available to a work entry is searched or considered for assignment to the work entry. Accordingly, embodiments of the present invention provide flexibility to system 100 administrators or operators.

In accordance with embodiments of the present invention, the resource selection rules associated with a work item can be altered or selected in accordance with environmental conditions or any other criteria. In addition, changes to the resource selection rules associated with a work item can be made at substantially the same time as environmental changes are detected.

At step 408, a first resource entry corresponding to the first resource 252 is obtained, for example, from a resource entry pool 104. Next, the resource validation rules or rules associated with the work item 244 are applied to the characteristics of the resource, or to the work validation rule or rules associated with the resource 252 (step 412). At step 416, a determination is made as to whether the resource 252 is valid with respect to the work item 244. In general, a resource 252 is valid if its characteristics are such that the minimum expressed by the resource validation rules of the work entry are met or exceeded. If the resource 252 is not valid for the work item 244 under consideration, a determination is made as to whether more resources 252 are available (step 420). If more resources 252 are available, the entry corresponding to the next resource 252 is obtained (step 424) and the system returns to step 412.

If the resource 252 under consideration is valid with respect to the available work item 244, the resource preference rules associated with the work item 244 are applied to the characteristics of the resource 252, or to the work preference rule or rules associated with the resource 252, to generate a score for the resource 252 (step 428). According to embodiments of the present invention, the resource preference rules can be any characteristic that is considered desirable as a criterion to steer a work item to an appropriate or best resource. In an additional aspect, resource preference rules or the selection of resource preference rules can be unrelated to the work entry with which they are associated. For example, different resource preference rules may be applied or associated with a work item according to environmental conditions or any other criteria. Changes to resource preference rules can be made at substantially the same time as environmental changes are detected. At step 432, a determination is made as to whether the score generated for the resource 252 is the best score obtained from among other resources 252 that have been scored for the resource 252 under consideration. If it is the best score, the resource entry for the resource 252 and its score are recorded as best (step 436). After recording the resource entry and its score as best, or if the score generated for the resource 252 is not the best score, a determination is made as to whether more resources 252 are available (step 420). If more resources 252 are available, the resource entry corresponding to the next resource is obtained (step 424) and the system returns to step 412 to consider the next resource. Accordingly, it can be appreciated that every resource that is valid for the work entry is scored with respect to that work entry.

If no more resources 252 are available (i.e. if all of the available resources have been considered), a determination is made as to whether a resource 252 for the work item 244 has been found (step 440). If a resource 252 has been found, the best resource 252 (i.e., the resource 252 associated with the resource entry having the highest score) is assigned to the work item 244 (step 444). If no resource 252 has been found for the work item 244, the work entry is placed in the work entry pool 108 (step 448). After the work item 244 has been assigned to the best resource 252, or the work entry for the work item 244 has been pooled, the process for assigning a work item 244 that becomes available to a resource 252 ends (step 452).

As can be appreciated by one of skill in the art, the process of assigning a resource 252 to a work item 244 may be initiated each time a work item 244 becomes available. Alternatively or in addition, the process of assigning a resource 252 to a work item 244 may be performed periodically.

In another embodiment, a work item 244 that has just become available may also be assigned service validation rules, and be denied service if the service validation rules are not met. For example, the service 112 may have been taken out of service, the service 112 may be unstaffed (i.e. there are no resources 252 present to do the work), the number of work entries allowed in the service's 112 work entry pool 108 may be limited to some administered maximum, or the estimated waiting time for the work item 244 exceeds some administered value.

In another embodiment, the resource allocation system can be used to select and automatically assign the best "n" work items 244 for an available resource 252, or the best "n" resources 252 for an available work item 244.

From the description provided herein, it can be appreciated that the present invention allows resources 252 and work items 244 to be matched based on the individual characteristics of each work item 244 and each resource 252. This allows a system 100 in accordance with the present invention to efficiently allocate resources 252 to work items 244. In particular, the present invention allows the abilities of an available resource 252 to be closely aligned with the needs of an individual work item 244.

In addition, it can be appreciated from the description provided herein that the present invention allows criteria that are unrelated to the characteristics of a work item or resource to be considered in matching work to resources. For example, environmental conditions, such as the personnel staffing a system 100, the time of day, date or any other criterion can be applied in determining the appropriateness of a match between a resource and a work item. Such a criterion may be applied in the form of an "if then" type statement, in order to apply different criteria in response to changing environmental conditions.

As can be appreciated by one of skill in the art, determining the characteristics of a work item or assigning resource selection rules or requirements to a work item 244 may be accomplished in various ways. For example, information maintained regarding a particular customer, for instance in a database maintained in storage 228, may be used to determine the characteristics of or to assign resource selection rules to a work item 244 associated with that customer. A customer may be identified using caller identification information, return e-mail address, by an account number provided by the customer in initiating contact with the server 204, or by other conventional methods for obtaining such information. As a further example, a telephone number dialed by a prospective customer to contact the server 204 may indicate the type of inquiry or characteristics of the customer, and thus the service and the requirements to associate with a work item 244. Accordingly, a work item 244 may inherit a default set of characteristics or resource selection rules from the particular service 112 that the work item is associated with. As still another example, a customer may be asked to make selections from menus as part of initiating contact with a server 204, and the provided information may be used to establish characteristics or requirements for association with the resulting work entry for the work item 244. Data regarding customers or consumers identified by, for example, caller identification systems or information provided by the customer or consumer may also be used to obtain information for use in establishing requirements from databases provided by third parties. In addition, depending on the status of the system 100 or environmental conditions, the characteristics or rules applied with respect to a work item can be varied. Furthermore, such variation can be performed in realtime. That is, as the status of the system 100 or environmental conditions change, the applied characteristics or rules can also change.

The characteristics of a resource 252 may be associated with a corresponding resource entry by an administrator using the input/output devices 224 in accordance with the directions of management. In accordance with alternative embodiments of the present invention, work selection rules, which may include service validation rules, work validation rules, and work preference rules, may be associated with a resource 252 by an administrator using the input/output devices 224 in accordance with the directions of management. For example, characteristics or service validation rules for a resource 252 may be determined by the training that a resource (e.g., an agent) has received. Other characteristics or work validation rules may be determined based on the capabilities or other attributes of a resource 252. For example, a resource 252 that is a trainee may have a different set of valid types of work than a more experienced resource 252. Characteristics or work preference rules can be used to steer work items 244 having particular characteristics to particular resources 252. For example, work items 244 that are associated with high value customers may be steered to particular resources 252 by setting forth characteristics or work preference rules for such resources that generate a high score in connection with complimentary resource preference rules established for the work item 244. Also, it should be appreciated that one component of the scoring of a resource 252 with respect to work items 244 may be the amount of time that a work item 244 has been waiting for a resource. Accordingly, a system 100 in accordance with the present invention may ensure that service time objectives are met, while closely matching work item 244 requirements to resource 252 capabilities.

The system 100 of the present invention can also be configured to allow the resources 252 some control over the work items 244 that they are assigned. For example, back office personnel may be permitted to choose from a number of work items 244 having high scores as the next work item 244 to be serviced by that resource 252.

In a further aspect, it can be appreciated that the characteristics or the validity and preference rules used to match a work item 244 to a resource 252 can be changed at any time. In particular, because the work entry pool 108 does not order the work items that it contains, the validation and preference rules can be dynamically changed, for example in response to the detection of extended wait times for particular types of work or other environmental conditions, at run-time. For example, a characteristic or a work validation rule associated with a resource 252 may be altered to change the type of work item 244 that the resource may be assigned to. In addition, characteristics or work preference rules associated with a resource 252 may be altered to make it more probable that the resource will be provided with only certain types of work entries. Accordingly, it can be appreciated that a system 100 in accordance with embodiments of the present invention may dynamically adapt to changes in the loads placed on the system caused by the requirements of work entries received by the system 100, by the capabilities of resources associated with the system 100, or by other environmental factors.

Although the foregoing description has used as examples a system 100 comprising a call center staffed by human agents available for real-time verbal and textual communications in connection with inquiries or requests for assistance made by human customers, it should be appreciated that the present invention is not so limited. For example, embodiments of the present invention may be utilized in connection with the assignment of work items 244 comprising processing tasks to resources 252 comprising computer processors. Furthermore, it should be appreciated that the present invention, while particularly useful in connection with the servicing of work items 244 in real-time, may be utilized to distribute work to resources 252 from a pool of work entries that may hold individual work entries for extended periods of time. For example, embodiments of the present invention may be utilized to distribute work items 244 comprising textual correspondence to resources 252 for action and possible reply.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A work allocation system, comprising:
a first resource entry pool associated with a first service, said first resource entry pool including a first plurality of resource entries;
a first resource entry included in said first plurality of resource entries, wherein said first resource entry is associated with a first system resource;
a first work entry pool associated with said first service, said first work entry pool including a first plurality of work entries;
a first work entry included in said first plurality of work entries, wherein said first work entry is associated with a first work item;
a matchmaker, wherein each work entry included in said first plurality of work entries in said first work entry pool is considered with respect to each resource entry included in said first plurality of resource entries in said first resource entry pool according to at least one work selection rule, and wherein each work entry included in said first plurality of work entries in said first work entry pool is evaluated against each resource entry included in said first plurality of resource entries in said first resource entry pool according to at least one work validation rule, to determine whether a prospective work item and resource pair is valid, wherein each valid prospective work item and resource pair is scored, wherein a first valid prospective work item and resource pair is scored according to a first criterion, and wherein a second valid prospective work item and resource pair is scored according to a second criterion;
identifying a best work item and resource item;
assigning the work item and the resource item with the best score to one another; and
a server, the server further comprising memory and a processor operable to execute instructions.

2. The system of claim 1, further comprising:
a second resource entry pool associated with a second service, said second resource entry pool including a second plurality of resource entries;
a second resource entry included in said second plurality of resource entries, wherein said second resource entry is associated with a second system resource;
a second work entry pool associated with said second service, said second work entry pool including a second plurality of work entries;
a second work entry included in said second plurality of work entries, wherein said second work entry is associated with a second work item, wherein each work entry in said second work entry pool is evaluated against each resource entry in said second resource entry pool.

3. The system of claim 2, wherein a third resource entry in said second plurality of resource entries is associated with a third system resource, and wherein a work item associated with a resource entry in said second work entry pool is not allocated to said third resource as a result of said evaluation of each work entry in said second work entry pool against each resource entry in said second resource entry pool.

4. The system of claim 3, wherein said third resource entry associated with said third system resource includes a first service validity rule, wherein said third resource entry is associated with said first resource entry pool, and wherein said third resource entry associated with said third resource includes a second service validity rule, wherein said third resource entry is associated with said second resource entry pool.

5. The system of claim 1, further comprising a switch, wherein said first resource is placed in communication with said first work item through said switch.

6. The system of claim 1, wherein said first resource is interconnected to said system by a local area network.

7. The system of claim 1, wherein said first resource is interconnected to said system by a private branch exchange.

8. The system of claim 1, wherein said first system resource comprises a human agent.

9. The system of claim 1, wherein said first work item comprises a customer requiring assistance.

10. The system of claim 9, wherein said customer is interconnected to said system by a public switched telephone network.

* * * * *